United States Patent [19]
Shimizu et al.

[11] Patent Number: 5,659,448
[45] Date of Patent: Aug. 19, 1997

[54] MAGNETIC HEAD SUPPORTING MECHANISM INCLUDING A SLIDER FIXED TO A SLIDER SPACER BY A FIXING AREA SMALLER THAN A CONTACT AREA

[75] Inventors: Toshihiko Shimizu; Hiromitsu Tokisue, both of Ibaraki-ken; Shuichi Sugahara, Odawara; Yoshinori Takeuchi, Ishioka; Naoki Maeda, Hiratsuka, all of Japan

[73] Assignee: Hitachi, Ltd., Tokyo, Japan

[21] Appl. No.: 542,593

[22] Filed: Oct. 13, 1995

[30] Foreign Application Priority Data

Oct. 20, 1994 [JP] Japan .................................. 6-255003

[51] Int. Cl.⁶ .......................................................... G11B 5/60
[52] U.S. Cl. .................................................................. 360/104
[58] Field of Search ...................................... 360/103, 104

[56] References Cited

U.S. PATENT DOCUMENTS

| | | | |
|---|---|---|---|
| 5,198,945 | 3/1993 | Blaeser et al. | 360/104 |
| 5,282,102 | 1/1994 | Christianson | 360/104 |
| 5,305,167 | 4/1994 | Nagase et al. | 360/104 |
| 5,428,489 | 6/1995 | Takamure et al. | 360/104 |
| 5,463,513 | 10/1995 | Hoshino | 360/104 |
| 5,467,236 | 11/1995 | Hatanai et al. | 360/104 |
| 5,473,487 | 12/1995 | Nagase | 360/104 |
| 5,473,488 | 12/1995 | Gustafson et al. | 360/104 |
| 5,530,606 | 6/1996 | Baasch et al. | 360/104 |

FOREIGN PATENT DOCUMENTS

| | | | |
|---|---|---|---|
| 54-133312A | 10/1979 | Japan . | |
| 55-22296A | 2/1980 | Japan . | |
| 1179287A | 7/1989 | Japan . | |
| 5-314628 | 11/1993 | Japan | 360/104 |

Primary Examiner—Jefferson Evans
Attorney, Agent, or Firm—Kenyon & Kenyon

[57] ABSTRACT

A magnetic head supporting mechanism includes a slider fixed to a slider spacer which is in turn fixed to a gimbal via a single area which is smaller than a contact area between the slider spacer and the gimbal so that the variation in the flying height of the slider is reduced and the positioning error due to the positional shifting of the head is also reduced. With this arrangement, it is possible to achieve a high-capacity magnetic disk storage device capable of operating at a high speed.

7 Claims, 4 Drawing Sheets

MAGNETIC HEAD SUPPORTING MECHANISM INCLUDING A SLIDER FIXED TO A SLIDER SPACER BY A FIXING AREA SMALLER THAN A CONTACT AREA

BACKGROUND OF THE INVENTION

1. Field of the Invention

The present invention relates to a disk storage device for magnetically recording and reproducing information, and more particularly to a technique to maintain a slider at a low flying height thereby achieving a high-capacity magnetic disk storage device capable of operating at a high speed.

2. Description of the Related Art

A typical magnetic head supporting mechanism which is practically used in a magnetic disk storage device is disclosed for example in JP-A-55-22296 (1980). In this technique, a magnetic head is mounted on a slider, and the slider is fixed to a gimbal with an adhesive or the like via the entire contact area between the slider and a flap of the gimbal. The gimbal is flexible in the direction perpendicular to the disk surface so that the slider may move above the disk maintaining a correct distance between the slider and disk surface. The gimbal is provided with a protrusion called a dimple so that the slider can rotate about the vertex of the dimple. A load arm includes a rigid portion for supporting the gimbal and a spring for applying a proper load to the slider via the dimple.

JP-A-54-133312 (1979) discloses a magnetic head supporting mechanism for use in a floppy disk storage device. In this magnetic head supporting mechanism a movable base plate is supported in a rotatable fashion by a fixed base plate, and a gimbal is connected to an end of the fixed base plate and also to an end of the movable base plate. A magnetic head is fixed to the gimbal in such a manner that the upper surface of the magnetic head is bonded via an adhesive or the like to the central part of the gimbal. Furthermore, the center of the back surface of the gimbal is supported by a supporting pin in such a manner as to suppress the fluctuation of the magnetic head in directions perpendicular to the disk surface and apply a proper load to a slider.

In another example disclosed in JP-A-1-179287 (1989), a gimbal is formed with four arms disposed in radial directions. Of these arms, ends of two arms which are not adjacent to each other are fixed to a slider, and ends of the remaining two arms are fixed to a load arm, thereby forming a head supporting mechanism. A spacer is disposed between the gimbal and the slider or otherwise a groove is formed on the surface of the slider to which the gimbal is attached so that the slider can have a proper degree of flexibility.

In a head supporting mechanism disclosed in JP-A-55-22296 (1980), a slider is fixed to a gimbal with an adhesive or the like via the entire contact area between the slider and a flap of the gimbal. In this structure, the slider is deformed due to warping or twisting which initially exists in the flap of the gimbal when the gimbal is produced, or due to warping or twisting which occurs in the flap of the gimbal due to the stress arising when the slider is bonded to the flap or due to a loading force or an external disturbance. The above deformation of the slider results in warping or twisting of the air bearing surface of the slider, and thus produces a variation in the flying height of the slider. Furthermore, the flap is influenced by the warping or twisting which initially exists in the flap of the gimbal when the gimbal is produced, or due to warping or twisting which occurs in the flap of the gimbal due to the stress arising when the slider is bonded to the flap or due to a loading force or an external disturbance.

The above influence creates a variation in the initial static attitude of the slider, and thus a variation in the flying height of the slider. If the flying height of the slider becomes less than a designed value, a possibility occurs that the slider comes in contact with a disk and data is lost. Therefore, it is impossible to reduce the flying height to a level low enough to further increase the recording density. This has been an obstacle to realization of a high-capacity magnetic disk storage device. The slider which is located at an end of a load arm is pressed against the disk surface by the load arm via a dimple. However, if the gimbal is deformed in a lateral direction or a direction along the disk surface during a seeking operation or when an uncontrollable condition occurs, slipping of the dimple occurs. The dimple will be held at the slipped position by a frictional force applied to the dimple, and thus a positional error occurs between the slider and the load arm. As a result, each head of a plurality of head supporting mechanisms has a positional error. In the case of a dedicated servo method, the above positional error results in an insufficient positioning accuracy, while in the case of an embedded servo method, it is needed to correct the position of each of the plurality of heads, which causes a delay in access time.

Also in a magnetic head supporting mechanism disclosed in JP-A-54-133312 (1979), the entire upper surface of a slider is fixed to a gimbal, and therefore, warping or twisting occurs between the gimbal and the slider, which causes variations in flying height. Thus, it is impossible to achieve a high-capacity magnetic disk storage device. Furthermore, since a supporting pin is in contact with the gimbal, the deformation of the gimbal causes a head to be shifted in position via a frictional force as in JP-A-55-22296 (1980). In a floppy disk storage device, only one disk and two or less magnetic disks are used. Therefore, the shifting of the head position does not lead to a serious delay in access time. However, in the case of a magnetic disk storage device which includes a plurality of disks and ten or more magnetic heads, the shifting of the head position produces serious problems.

In a head supporting mechanism disclosed in JP-A-1-179287 (1989), in addition to the problems associated with warping and twisting as in the above examples, there are further problems as described below. That is, the surface of a gimbal to which a slider is attached is divided into two pieces, and these two pieces are pulled to each other due to a pressing load applied to the slider, which causes the air bearing surface of the slider to be warped. In particular, the twisting between the slider fixing surfaces imposes a great influence. In this example, since there is no dimple in a sliding part, the positional shifting of a head does not occur. However, the absence of the dimple results in an absence of damping due to friction, which in turn results in a great amplitude of vibration. As a result, it is difficult to achieve high positioning accuracy.

SUMMARY OF THE INVENTION

It is an object of the present invention to provide a technique to reduce the variation in the flying height due to warping or twisting of a gimbal or a slider so as to achieve a low flying height of the slider, the technique also preventing a positional shift of a head which would otherwise occur due to the friction of a dimple, while providing a proper Coulomb damping or a proper damping force by means of friction so as to improve the positioning accuracy thereby achieving a high recording density and a short access time and thus achieving a high-capacity magnetic disk storage device capable of operating at a high speed.

To achieve the above object, the present invention provides a magnetic head supporting mechanism characterized in that a slider is fixed to a slider spacer, and the slider spacer is fixed to a gimbal via a single area which is smaller than the contact area between the slider spacer and the gimbal.

In this invention, since the slider spacer is fixed to the gimbal via the single area smaller than the contact area between the slider spacer and the gimbal, deformation is transmitted to other portions via a smaller area than that in the known techniques described above, and the influence of the warping and twisting of the gimbal and the slider is reduced. Furthermore, since the slider spacer is fixed to the gimbal via the single area, the slider fixing surface is not pulled by a loading force and no deformation of the gimbal and the slider occurs, as opposed to the third example described above. As a result, it is possible to reduce the variation in the flying height due to the warping and twisting of the gimbal and the slider.

Furthermore, unlike the first or second example described above, the slider spacer makes a dimple or an supporting pin unnecessary. As a result, the positioning error of the head, which would occur due to the friction force in the first or second example described above, is prevented. Furthermore, there is provided an area at which the gimbal and the slider spacer are in contact with each other without being fixed so as to providing a proper amount of Coulomb damping or damping force by means of friction thereby preventing the amplitude of vibration from becoming too great, as opposed to the third example described above. As a result, the positioning error of the head, which would occur due to friction of a dimple if the dimple is employed, is prevented, while providing a proper damping force. Therefore, the positioning accuracy is improved and the access time is reduced.

In the present invention, as described above, the variation in the flying height due to the warping or twisting of the gimbal and the slider is prevented, and the slider can be maintained at a low flying height. Furthermore, the positioning error of the head which would occur due to friction of the dimple if the dimple is employed is prevented, while providing a proper amount of Coulomb damping or damping force by means of friction thereby improving the positioning accuracy. As a result, it is possible to increase the recording density and reduce the access time, and thus achieve a high-capacity magnetic disk storage device capable of operating at a high speed.

DESCRIPTION OF THE PREFERRED EMBODIMENTS

Referring to the accompanying drawings, embodiments of the present invention will be described in detail below.

Figure 1:
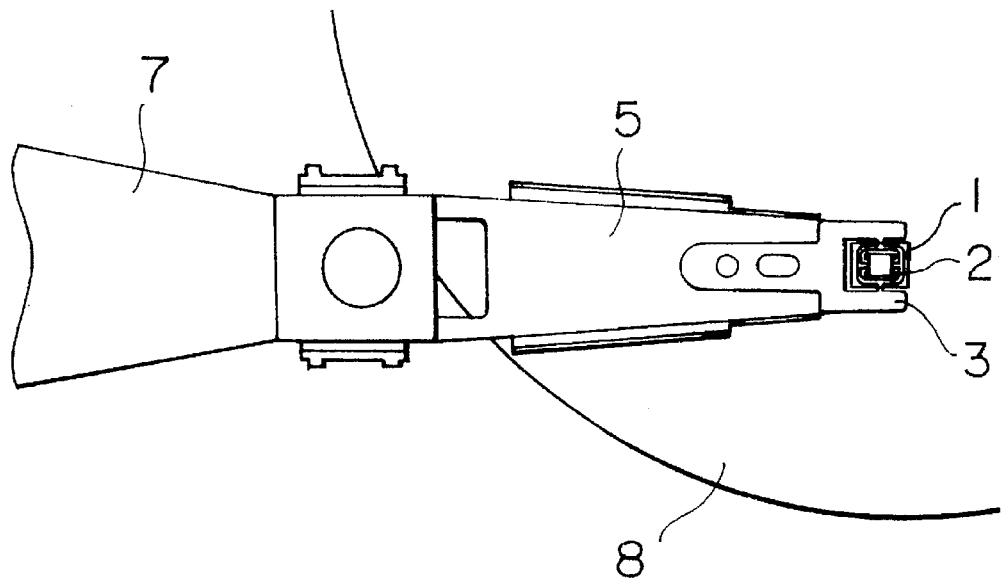
FIG. 1 is a top view of a magnetic head supporting mechanism according to a first embodiment of the present invention.
Figure 2:
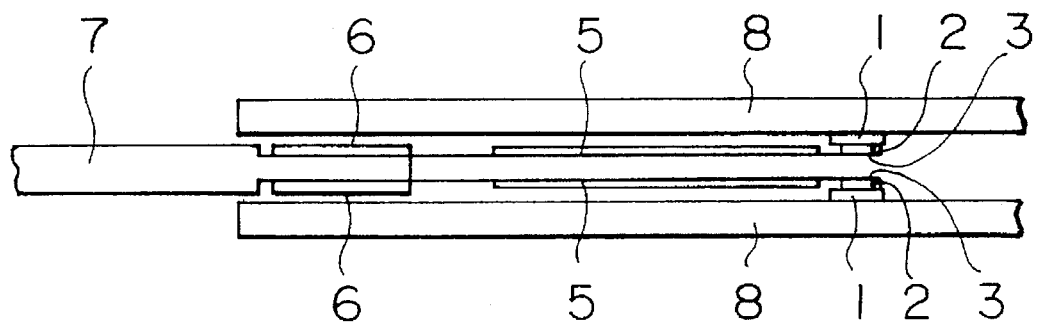
FIG. 2 is a side view of the magnetic head supporting mechanism according to the first embodiment of the present invention.
Figure 3:
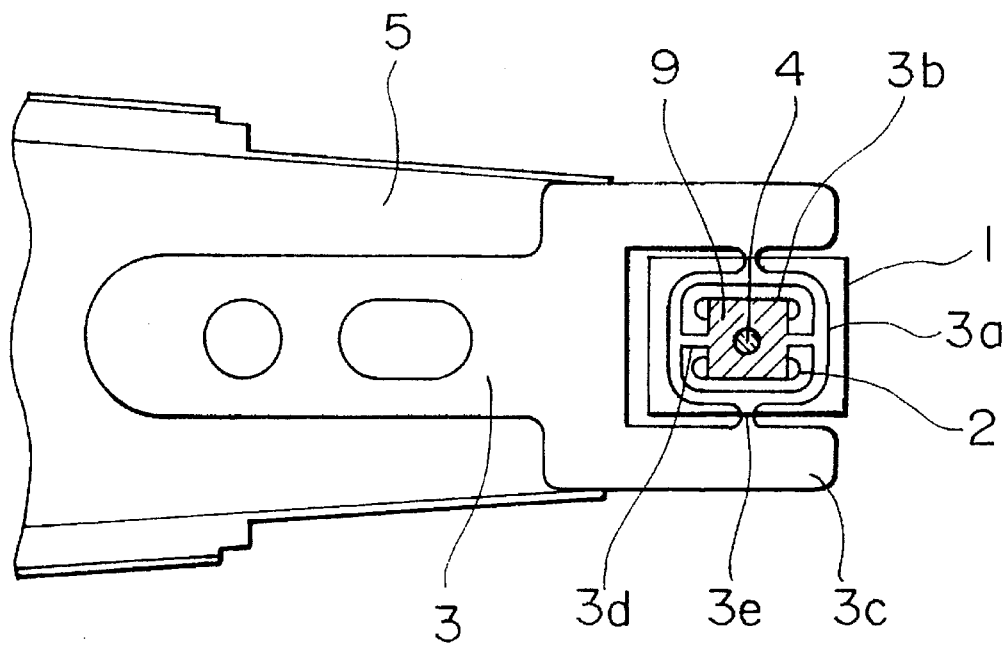
FIG. 3 is an enlarged view of an end portion of the magnetic head supporting mechanism according to the first embodiment of the present invention.

FIG. 1 is a top view of a magnetic head supporting mechanism embodying the present invention, wherein its side view is shown in FIG. 2, and its end portion is shown in an enlarged fashion in FIG. 3. In these figures, like reference numerals designate like elements. As shown in these figures, a magnetic head is mounted on a slider 1, and the slider 1 is fixed to a slider spacer 2 via an adhesive or the like. As shown in FIG. 3, the slider spacer 2 is fixed, by means of welding or via an adhesive, to a gimbal 3 at a single fixing area 4 which is smaller than the contacting area between the slider spacer 2 and the gimbal 3.

The gimbal 3 includes: a ring-shaped flexible part 3a; a slider fixing part 3b; a load arm fixing part 3c; inner arms 3d for connecting the slider fixing part 3b to the ring-shaped flexible part 3a; and outer arms 3e for connecting the ring-shaped flexible part 3a to the load arm fixing part 3c wherein all these parts are formed in an integral fashion. The gimbal 3 is fixed to a load arm 5 by means of for example welding. The load arm 5 is connected to a guide arm 7 via a spacer 6. In the example shown in these figures, access to a desired track is performed according to an in-line access scheme, that is, the access is achieved by rotating the head supporting mechanism about a base portion of the guide arm 7 in radial directions on a disk 8.

In this embodiment, the slider spacer 2 and the gimbal 3 are connected to each other via the fixing area which is smaller than that according to conventional techniques. As a result, the warping or twisting of the slider fixing part 3b of the gimbal 3 has only a slight influence on the air bearing surface of the slider 1. Furthermore, the warping or twisting of the slider 1 or the slider spacer 2 has little influence on the slider fixing part 3b, which results in a reduction in the variation of the initial static attitude of the gimbal 3. As a result of the reduction in the variation in the flatness of the air bearing surface of the slider 1 and the reduction in the variation in the initial static attitude of the gimbal 3, the variation in the flying height of the slider 1 is reduced, which makes it possible to achieve a small flying height and thus a high-capacity recording density.

The smaller the fixing area via which the slider spacer 2 and the gimbal 3 is connected to each other is, the smaller the deformation of the slider 1 and the gimbal 3 is. However, the fixing area is too small, the fixing strength becomes insufficient. Therefore, it is desirable that the fixing area be within the range from about 0.07 mm$^2$ to 0.2 mm$^2$. Furthermore, in the embodiment, since the slider spacer 2 is fixed to the gimbal 3 via the single fixing area 4, a pressing load against the slider 1 is not dispersed over a wide area. Therefore, no pulling force between two regions of the slider occurs, as opposed to the mechanism disclosed in JP-A-1-179287 (1989). This ensures that the slider 1 and the gimbal 3 are not deformed easily, and the load against the slider 1 is applied via a more definite point. As a result, the variation in flying height of the slider 1 is further reduced.

Figure 4:
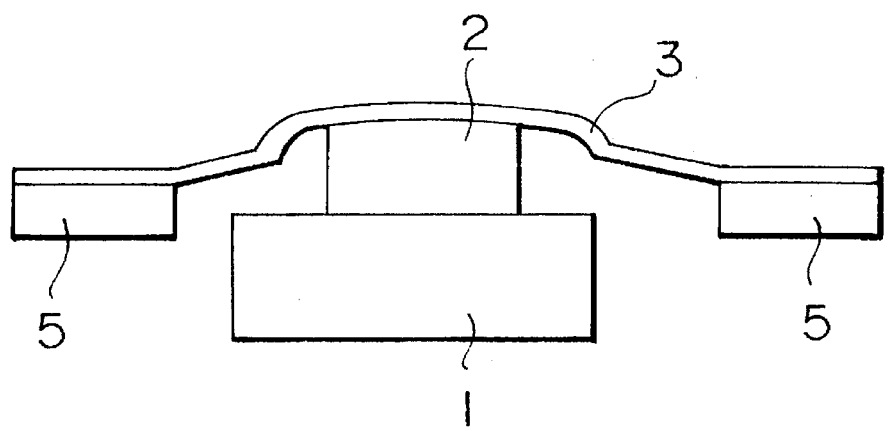
FIG. 4 is a schematic diagram illustrating a deformation of a gimbal of the magnetic head supporting mechanism according to the first embodiment of the present invention, wherein the deformation occurs due to the application of a load.

Furthermore, even if the gimbal 3 is deformed due to a load as shown in FIG. 4, the gimbal 3 never comes in contact with the slider 1 since there is a clearance corresponding to the thickness of the slider spacer 2. As a result, the slider 1 can rotate freely in the direction perpendicular to the disk surface and thus can move above the disk maintaining a proper distance between the slider and the surface of the disk. Therefore, unlike JP-A-55-22296 (1980), no dimple is needed, and the positional shift of the head due to the friction of the dimple never occurs. Furthermore, the slider spacer 2 is in contact with the slider fixing part 3b of the gimbal 3 frictionally at a friction area 9 in which both of them are in contact with each other without being fixed to each other. Therefore, the Coulomb damping or damping force by means of friction prevents the slider or the gimbal from vibrating to an extreme degree when a vibration occurs due to an external disturbance. As a result, the positioning accuracy is improved, and the access time is reduced. This makes it possible to achieve a high-capacity magnetic disk storage device capable of operating at a high speed.

Furthermore, in the embodiment shown in FIGS. 1 and 2, the outer arms 3e of the gimbal are disposed at a right angle to the longitudinal direction of the load arm 5 and the inner arms 3d of the gimbal are disposed on the center line in the longitudinal direction of the load arm 5 so that the rotation center of the slider 1 in the direction perpendicular to the disk surface corresponds with the longitudinal direction and the width direction of the head supporting mechanism. This ensures that the load against the slider 1 is applied via a definite point. Furthermore, the above arrangement reduces, on the variation in flying height of the slider 1, the influence of the variation in the initial static attitude of the slider 1 and the variations in the dimensional errors arising during a production process.

Furthermore, in the embodiment shown in FIGS. 1 and 2, the gimbal 3 is attached to the side of the load arm 5 opposite to the disk 8 so that the head supporting mechanism can be disposed at a small height relative to the disk surface and thus the spacing between disks can be reduced. This makes it possible to increase the number of disks and thus the capacity of the magnetic disk storage device.

Figure 5:
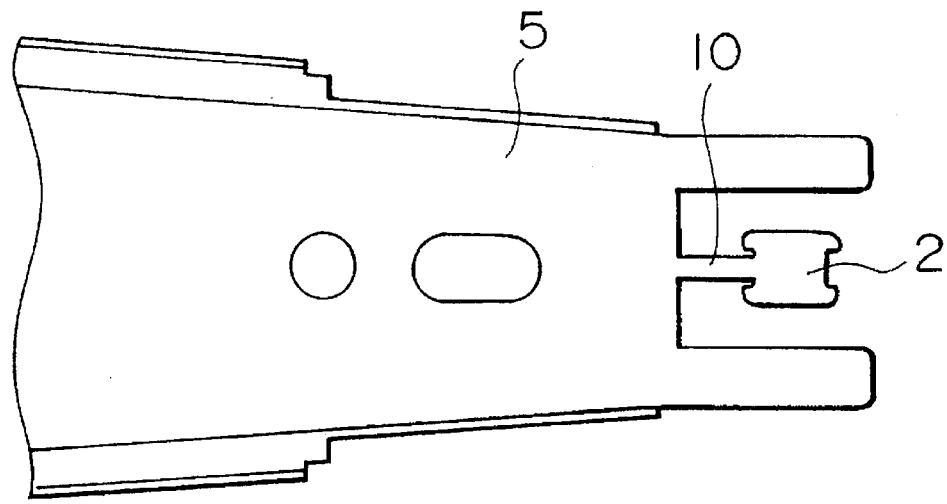
FIG. 5 is a top view of a magnetic head supporting mechanism according to a second embodiment of the present invention.

FIG. 5 is a top view of a second embodiment of the present invention. This embodiment is one example of a technique of producing the head supporting mechanism shown in FIGS. 1 to 3. Both slider spacer 2 and load arm 5 are formed in the same plane using the same material. A temporary connecting bar 10 is cut away after a gimbal 3 is fixed to the slider spacer 2 so as to obtain the structure as in the first embodiment.

Because both the slider spacer 2 and the load arm 5 are produced in an integral fashion via the temporary connecting bar 10, the head supporting mechanism can be easily assembled with a high accuracy. Furthermore, this technique allows a reduction in the number of elements and thus a reduction in production cost.

Figure 6:
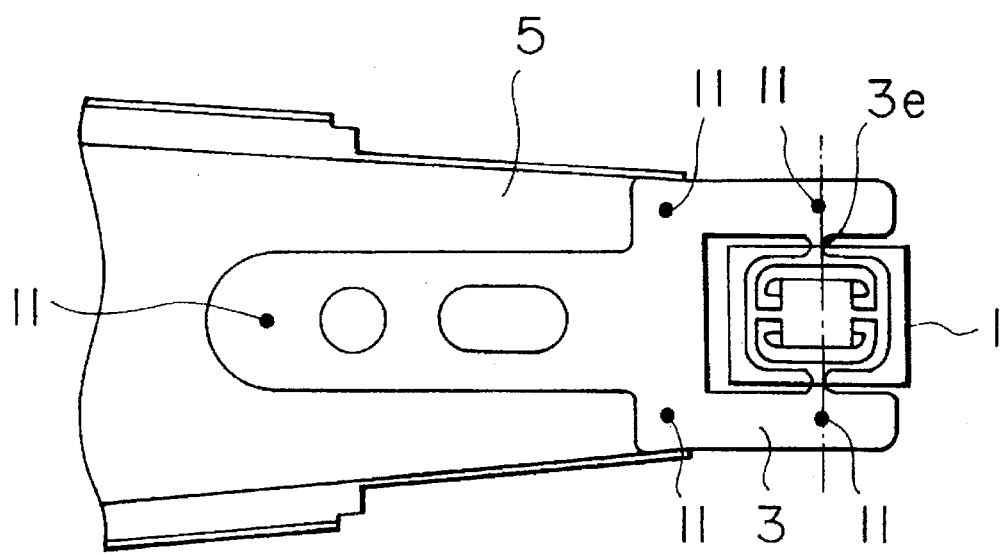
FIG. 6 is a top view of a magnetic head supporting mechanism according to a third embodiment of the present invention.

FIG. 6 is a top view of a third embodiment of the present invention. In this embodiment, as shown in FIG. 6, a gimbal 3 is fixed by means of welding to a load arm 5 at five points wherein two fixing points of these five are located on the load arm fixing part 3c at positions on the extension line of the outer arms 3e of the gimbal. As a result of such the arrangement in which the fixing points are located on the extension of the outer arms 3e of the gimbal, a loading force is applied to the slider 1 at points on the extension of the outer arms 3e of the gimbal. This ensures that the loading points become more definite, and the loading points are prevented from shifting due to the variation in the static attitude of the slider 1.

Figure 7:
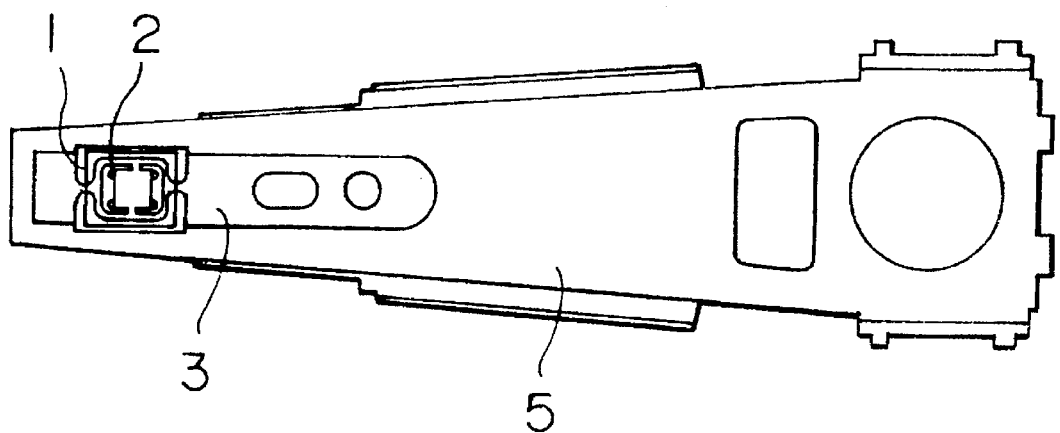
FIG. 7 is a top view of a magnetic head supporting mechanism according to a fourth embodiment of the present invention.
Figure 8:
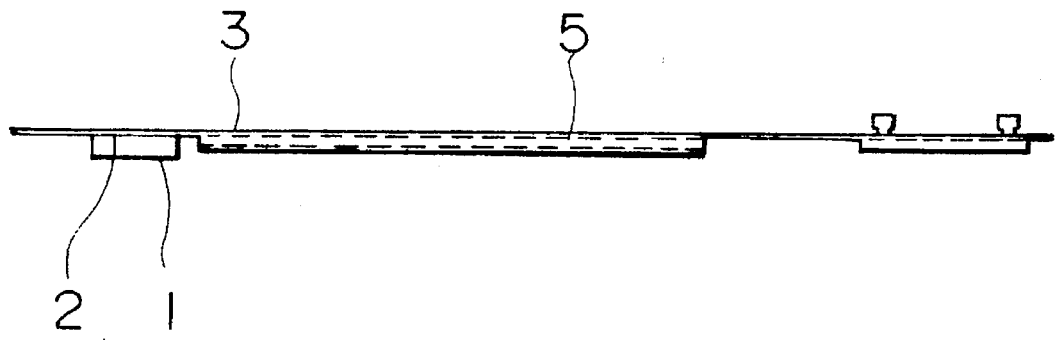
FIG. 8 is a side view of a magnetic head supporting mechanism according to the fourth embodiment of the present invention.

FIG. 7 is a top view of a fourth embodiment according to the present invention wherein its side view is shown in FIG. 8. In the embodiment described above in connection with FIGS. 1 to 3, the outer arms 3e of the gimbal are disposed at a right angle to the longitudinal direction of the load arm 5, and the inner arms 3d of the gimbal are disposed on the center line in the longitudinal direction of the load arm 5. In contrast, in the embodiment shown in FIGS. 7 and 8, the outer arms 3e of the gimbal are disposed on the center line in the longitudinal direction of the load arm 5, and the inner arms 3d of the gimbal are disposed at a right angle to the longitudinal direction of the load arm 5. In this arrangement, the fixing points are not needed to be located on a line across the width of the load arm 5. As a result, it is possible to reduce the width of the head supporting mechanism, and thus, compared with the example shown in FIG. 1, it is possible to access a further inner area of the disk surface without having interference with a disk spindle or other elements. This allows a wider area of the disk surface to be used as a recording area. Therefore, it is possible to achieve a magnetic disk storage device having a high storage capacity.

In this embodiment, as described above, the variations in the flying height due to the warping or twisting of the gimbal or the slider are prevented. As a result, the slider can be maintained at a lower flying height. Furthermore, the positional shifting of the head due to the friction of a dimple does not occur. The damping force by means of proper friction leads to an improvement in the positioning accuracy. As a result, it is possible to increase the recording density and reduce the access time. Thus, it is possible to achieve a high-capacity magnetic disk storage device capable of operating at a high speed.

What is claimed is:

1. A magnetic head supporting mechanism for use in a magnetic disk storage device, said magnetic head supporting mechanism including: a gimbal which supports a slider via a slider spacer, said slider having a magnetic head mounted thereon; and a load arm, one end of said load arm being connected to said gimbal thereby supporting said gimbal, the other end being connected to a guide arm, wherein said slider is fixed to said slider spacer, and said slider spacer is fixed to said gimbal by means of welding via a single fixing area which is smaller than a contact area between said slider spacer and said gimbal.

2. A magnetic head supporting mechanism according to claim 1, wherein said gimbal is fixed to the side of said load arm opposite to a surface of a disk above which said slider is supported.

3. A magnetic head supporting mechanism according to claim 2, wherein said slider spacer has a thickness equal to that of said load arm.

4. A magnetic head supporting mechanism according to claim 3, wherein said gimbal comprises: a fixing part for connecting said gimbal to said load arm; a ring-shaped flexible part connected to said fixing part via two outer arms; and a slider fixing part disposed in the inner area of the ring of said flexible part, said slider fixing part being connected to said flexible part via two inner arms, said two inner arms being disposed at a right angle to said outer arms.

5. A magnetic head supporting mechanism according to claim 4, wherein the outer arms of said gimbal are disposed at a right angle to a longitudinal direction of said load arm, the inner arms of said gimbal are disposed on the center line in the longitudinal direction of said load arm, and said gimbal is fixed by means of welding to said load arm at points located on the extension of the outer arms of said gimbal.

6. A magnetic disk storage device provided with a magnetic head supporting mechanism, said magnetic head supporting mechanism including: a gimbal which supports a slider via a slider spacer, said slider having a magnetic head mounted thereon; and a load arm, one end of said load arm being connected to said gimbal thereby supporting said gimbal, the other end being connected to a guide arm, wherein said slider is fixed to said slider spacer, and said slider spacer is fixed to said gimbal by means of welding via a single fixing area which is smaller than a contact area between said slider spacer and said gimbal.

7. A magnetic disk storage device according to claim 6, wherein said gimbal of said magnetic head supporting mechanism comprises: a fixing part for connecting said gimbal to said load arm; a ring-shaped flexible part connected to said fixing part via two outer arms; and a slider fixing part disposed in the inner area of the ring of said flexible part, said slider fixing part being connected to said flexible part via two inner arms, said two inner arms being disposed at a right angle to said outer arms.

* * * * *